US011933087B2

(12) United States Patent
Li et al.

(10) Patent No.: US 11,933,087 B2
(45) Date of Patent: Mar. 19, 2024

(54) STORAGE CONSOLE

(71) Applicant: Ford Global Technologies, LLC, Dearborn, MI (US)

(72) Inventors: Mona Li, Nanjing (CN); Wei Xu, Nanjing (CN); Leo Chen, Nanjing (CN); Kevin Shen, Nanjing (CN)

(73) Assignee: Ford Global Technologies, LLC, Dearborn, MI (US)

( * ) Notice: Subject to any disclaimer, the term of this patent is extended or adjusted under 35 U.S.C. 154(b) by 46 days.

(21) Appl. No.: 17/676,332

(22) Filed: Feb. 21, 2022

(65) Prior Publication Data

US 2022/0290473 A1 Sep. 15, 2022

(30) Foreign Application Priority Data

Mar. 11, 2021 (CN) ........................ 202120517641.X

(51) Int. Cl.
*E05B 83/32* (2014.01)
*E05B 1/00* (2006.01)
(Continued)

(52) U.S. Cl.
CPC ............ *E05B 83/32* (2013.01); *E05B 1/0038* (2013.01); *E05B 81/16* (2013.01); *E05B 85/08* (2013.01); *E05C 3/162* (2013.01); *E05C 3/34* (2013.01)

(58) Field of Classification Search
CPC .......... E05B 83/28; E05B 83/30; E05B 83/32; E05B 1/0038; E05C 9/08; E05C 3/00;
(Continued)

(56) References Cited

U.S. PATENT DOCUMENTS 3,596,952 A * 8/1971 Hinkle ...................... E05C 9/08
292/124
11,541,792 B2 * 1/2023 Ahn ........................ E05B 83/32
(Continued)

FOREIGN PATENT DOCUMENTS

CN 204161223 U * 2/2015
CN 204172791 U * 2/2015
(Continued)

OTHER PUBLICATIONS

Computer Generated Translation for WO 2018/225506, Generated on Jun. 1, 2023, https://worldwide.espacenet.com/ (Year: 2023).*

*Primary Examiner* — Alyson M Merlino
(74) *Attorney, Agent, or Firm* — Vichit Chea; Price Heneveld LLP

(57) ABSTRACT

A storage console includes a housing with a storage chamber, two closure members connected to the housing, an actuator movably arranged in the housing and a latch mechanism rotatably connected to the housing. The two closure members can be rotated to open or close the storage chamber. The latch mechanism includes two latch members and a synchronizer connected between the two latch members. The movement of the actuator actuates the two latch members to rotate to a lock position in which the two latch members engage with the two closure members or a release position in which the two latch members are separated from the two closure members. The two closure members of the storage console can be opened synchronously by use of the actuator and closed independently of each other.

20 Claims, 4 Drawing Sheets

(51) Int. Cl.

| | |
|---|---|
| ***E05B 81/16*** | (2014.01) |
| ***E05B 85/08*** | (2014.01) |
| ***E05C 3/16*** | (2006.01) |
| ***E05C 3/34*** | (2006.01) |

(58) Field of Classification Search

CPC . E05C 3/006; E05C 3/008; E05C 3/12; E05C 3/16; E05C 3/162; E05C 3/22; E05C 3/30; E05C 3/34; E05C 19/10; E05C 19/12

See application file for complete search history.

(56) References Cited

U.S. PATENT DOCUMENTS

| | | | | |
|---|---|---|---|---|
| 2008/0231060 | A1* | 9/2008 | Carabalona | E05B 83/32 292/251.5 |
| 2019/0257123 | A1* | 8/2019 | Suzuki | E05B 83/32 |

FOREIGN PATENT DOCUMENTS

| | | | | | |
|---|---|---|---|---|---|
| CN | 204960567 | U | * | 1/2016 | |
| CN | 206217694 | U | * | 6/2017 | |
| CN | 111086461 | A | * | 5/2020 | |
| CN | 210714213 | U | * | 6/2020 | |
| CN | 211592415 | U | * | 9/2020 | |
| CN | 112046401 | A | * | 12/2020 | |
| CN | 113153029 | A | * | 7/2021 | |
| FR | 3041577 | A1 | * | 3/2017 | E05B 1/0038 |
| WO | WO-2017072426 | A1 | * | 5/2017 | B60R 7/04 |
| WO | WO-2018225506 | A1 | * | 12/2018 | |

* cited by examiner

STORAGE CONSOLE

CROSS-REFERENCE TO RELATED APPLICATION

This application claims foreign priority benefits under 35 U.S.C. § 119(a)-(d) to Chinese Application No. 202120517641X filed Mar. 11, 2021, which is hereby incorporated by reference in its entirety.

FIELD OF THE DISCLOSURE

The present disclosure generally relates to a storage device for a vehicle, and more particularly relates to a storage console for a vehicle.

BACKGROUND OF THE DISCLOSURE

Vehicles generally have storage devices for passengers to place articles, for example a center console or an armrest box located between vehicle seats, which include storage chambers for depositing articles carried by drivers or passengers. Doors or covers for the storage chambers are usually pivotable along rear edges; however, such covers may make it more difficult for rear passengers to access to the storage chamber when they are in an open position. Therefore, it may be desirable to provide a storage console that facilitates the rear passengers to use the storage chamber.

SUMMARY OF THE DISCLOSURE

According to a first aspect of the present disclosure, a storage console is provided and includes a housing with a storage chamber, two closure members connected to the housing and rotatable to open or close the storage chamber, and an actuator movably arranged in the housing. The storage console also includes a latch mechanism rotatably connected to the housing, wherein the latch mechanism includes two latch members and a synchronizer which is connected between the two latch members and is used to make the two latch members rotate synchronously, wherein movement of the actuator actuates the two latch members to rotate to a lock position in which the two latch members engage with the two closure members or a release position in which the two latch members are separated from the two closure members.

According to a second aspect of the present disclosure, a storage console is provided and includes a housing including a storage chamber with an opening, a first closure member and a second closure member rotatably connected to the housing and rotatable mirror-symmetrically to open or close the opening, and an actuator movably arranged in the housing. The storage console also includes a latch mechanism rotatably connected to the housing, wherein the latch mechanism includes a first latch member, a second latch member and a synchronizer which is connected between the first latch member and the second latch member and is used to make the first latch member and the second latch member rotate synchronously, wherein movement of the actuator actuates the first latch member and the second latch member to rotate to a lock position in which the first latch member and the second latch member engage with the first closure member and the second closure member, respectively, or a release position in which the first latch member and the second latch member are separated from the first closure member and the second closure member, respectively.

According to a third aspect of the present disclosure, a storage console for a vehicle is provided and includes a housing configured to be located on a vehicle and including a storage chamber with an opening, a first closure member and a second closure member rotatably connected to the housing and rotatable mirror-symmetrically to open or close the opening, and an actuator movably arranged in the housing. The storage console also includes a latch mechanism rotatably connected to the housing, wherein the latch mechanism includes a first latch member, a second latch member and a synchronizer which is connected between the first latch member and the second latch member and is used to make the first latch member and the second latch member rotate synchronously, wherein movement of the actuator actuates the first latch member and the second latch member to rotate to a lock position in which the first latch member and the second latch member engage with the first closure member and the second closure member, respectively, or a release position in which the first latch member and the second latch member are separated from the first closure member and the second closure member, respectively.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
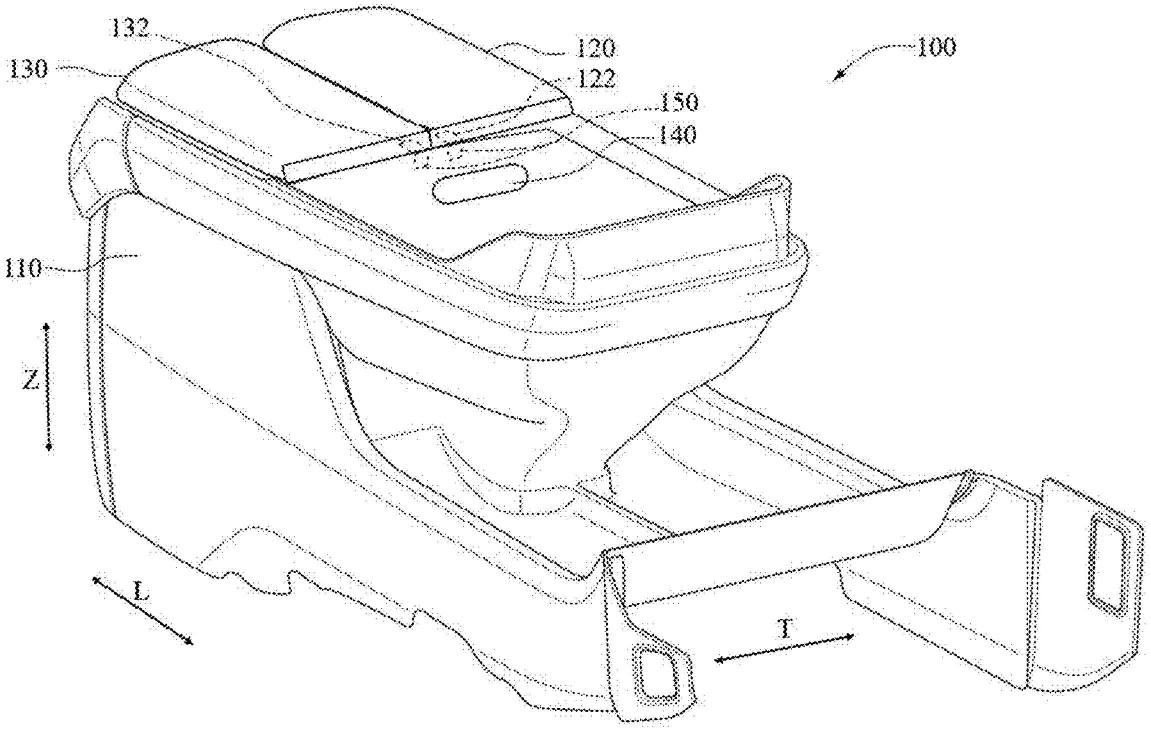
FIG. 1 is a schematic perspective view of a storage console showing closure members in a closed position according to one embodiment.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a storage compartment for a vehicle. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In a vehicle, a storage console is typically arranged between vehicle seats. The storage console includes storage chambers for depositing articles, and these storage chambers are generally located at positions where the armrest boxes or cup holders are located. For the regular closure members which rotate along the rear edge, the opened closure members may block the rear passengers from accessing to the storage chambers, consequently the difficulty of depositing or taking out the desired articles may be increased. In this manner, it may be not be user friendly for some passengers to use the storage console to deposit and fetch articles, such that the convenience of the storage console may be limited.

The present disclosure provides a storage console, closure members of which can be opened or closed along two opposite edges, so that the possibility of the opened closure member blocking the passengers is reduced, and the convenience and practicability are increased.

Figure 2:
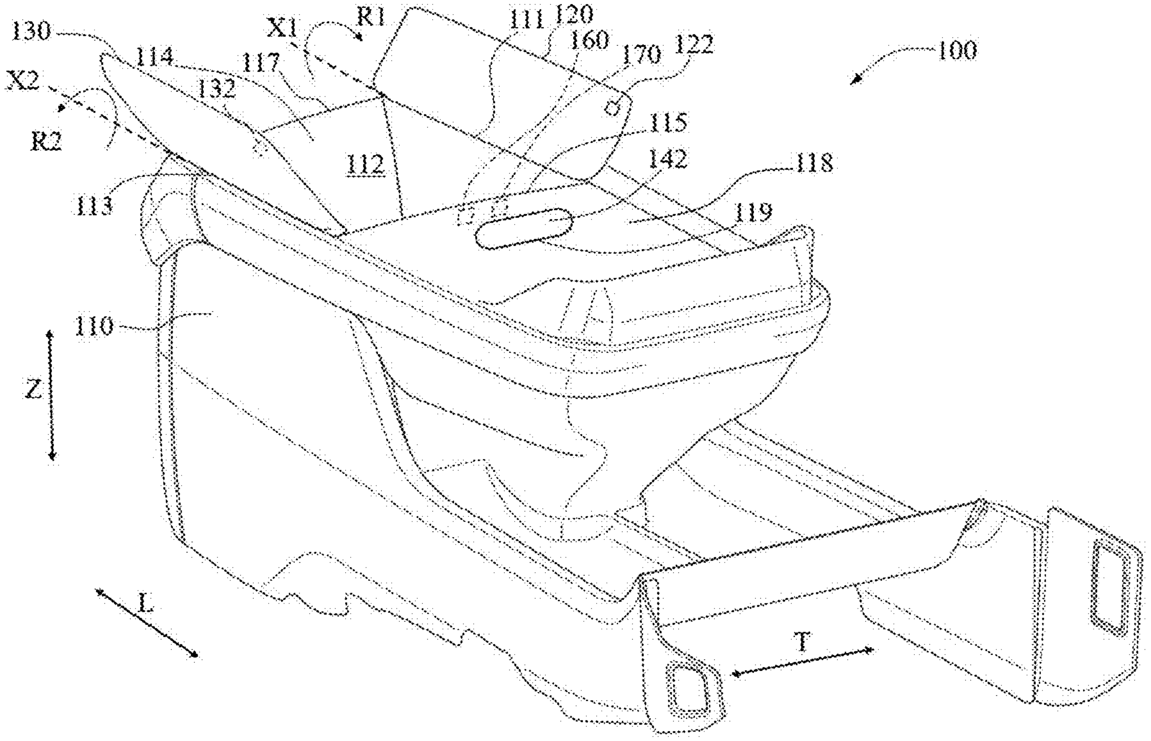
FIG. 2 is another schematic perspective view of the storage console shown in FIG. 1 showing the closure members in an open position.

Referring to FIGS. 1 and 2, a storage console 100 is illustrated, according to an embodiment showing the closure members in a lock position and in a release position, respectively. The storage console 100 includes a housing 110 and two closure members, for example a first closure member 120 and a second closure member 130. The housing 110 includes a storage chamber 114 with an opening 112. The opening 112 substantially can be rectangle-shaped and has a first edge 111 and an opposite second edge 113. The first edge 111 and the second edge 113 can be parallel and substantially extend along a longitudinal direction L. The first closure member 120 is connected to the housing 110 at the first edge 111 and can rotate around an axis X1 which can be parallel to the first edge 111 or the longitudinal direction L. The second closure member 130 is connected to the housing 110 at the second edge 113 and can rotate around an axis X2 which can be parallel to the second edge 113 or the longitudinal direction L. The first closure member 120 can rotate around the axis X1 along a direction R1 (for example, the clockwise direction) and the second closure member 130 can rotate around the axis X2 along a direction R2 (for example, the counter-clockwise direction), thereby moving from the closed position shown in FIG. 1 to the open position shown in FIG. 2. In other words, the first closure member 120 and the second closure member 130 can rotate mirror-symmetrically with respect to an axis which is parallel to the axis X1 or axis X2 when opening or closing the storage chamber 114. In this manner, the blocking to the front passengers and rear passengers caused by the opened first closure member 120 and second closure member 130 can be reduced, so that the practicability and convenience of the storage console 100 can be increased.

In some embodiments, with specific reference to FIGS. 1 and 2, the opening 112 can have a third edge 115 and a fourth edge 117 that extend along a transverse direction T. A lower surface of the first closure member 120 is provided with a first engaging groove 122. The first engaging groove 122 can be located at an end of the first closure member 120 near the third edge 115 and close to the second closure member 130. Similarly, a lower surface of the second closure member 130 is provided with a second engaging groove 132. The second engaging groove 132 can be located at an end of the second closure member 130 near the third edge 115 and close to the first closure member 120.

In some embodiments, the longitudinal direction L can correspond to the length direction of the vehicle, and the transverse direction T can correspond to the width direction of the vehicle. In other embodiments, the longitudinal direction L and the transverse direction T can correspond to the width direction and the length direction of the vehicle respectively. The longitudinal direction L and the transverse direction T can be substantially perpendicular and can also form other angles. It is to be understood that according to some embodiments there are no special restrictions on the orientation and angle with regard to the longitudinal direction L and the transverse direction T in the present disclosure, those skilled in the art can make a reasonable choice on the basis of the shape of the storage chamber or closure member to implement in other embodiments, these other embodiments should also be included in the scope of the present disclosure.

It is to be understood that structures involved in "rotate" or "rotatable" mentioned in the present disclosure can be implemented by conventional structures in the art, such as pivoting or hinge structures, and structures involved in "move" or "movable" can also be implemented by conventional structures in the art, such as guide rails and sliding chutes, these are known for those skilled in the art, therefore specific structures are not described in detail herein.

In some embodiments, with reference to FIG. 2, a housing 110 is provided with a receiving hole 119 for accommodating an actuator 140 shown in FIG. 1 on an end 118 in the longitudinal direction L. The end 118 adjoins the third edge 115 of the opening 112 which adjoins the first engaging groove 122 of the first closure member 120 and adjoins the second engaging groove 132 of the second closure member 130. The actuator 140 is located in the receiving hole 119 of the end 118, and an upper portion of the actuator 140 (for example, a drive button 142) can be exposed to an upper surface of the end 118 or can be flushed with the upper surface of the end 118. The actuator 140 can move in the receiving hole 119 along a direction Z (for example, a vertical direction or a height direction of the vehicle).

Figure 3:
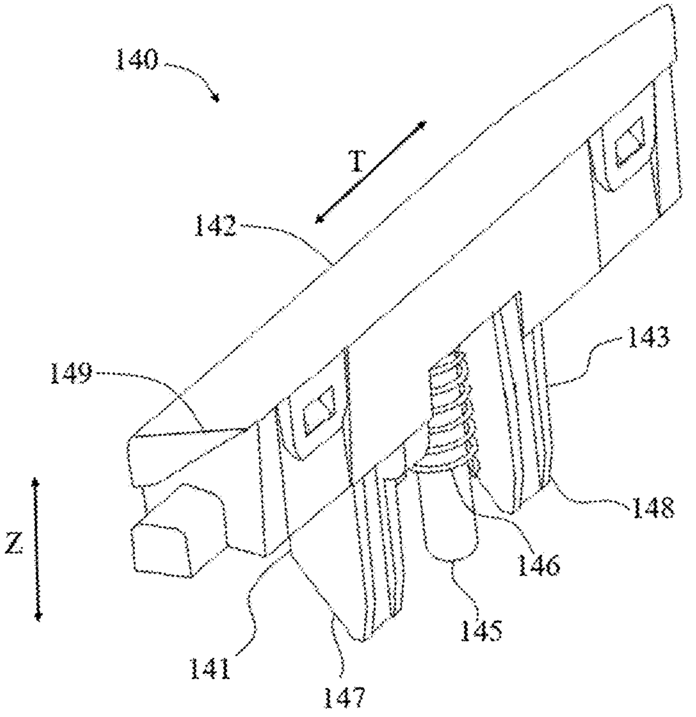
FIG. 3 is a schematic perspective view of an actuator of a storage console, according to one embodiment.

FIG. 3 illustrates an actuator 140 of a storage console 100 according to one embodiment of the present disclosure. In some embodiments, the actuator 140 can include a drive button 142 and two drive pillars, such as a first drive pillar 141 and a second drive pillar 143, wherein the drive button 142 and the two drive pillars are interconnected. The drive button 142 can have a slanting upper surface 149, and thus the actuator 140 can have a surface appearance matched with the end 118 of the housing 110. The first drive pillar 141 and the second drive pillar 143 can be fixedly connected to a bottom of the drive button 142, extend downward along the direction Z and be spaced apart from each other in the transverse direction T. The first drive pillar 141 and the second drive pillar 143 can each have a pointed end, namely a first pointed end 147 and a second pointed end 148, respectively, in order to make contact with a corresponding contact part. The actuator 140 can also include a reset element 146 arranged around a connecting pillar 145 that is arranged between the first drive pillar 141 and the second drive pillar 143 at the bottom of the drive button 142, and the reset element 146 is sleeved on the outside of the connecting pillar 145. The connecting pillar 145 can be cylindrical and the reset element 146 can be a helical spring. The reset element 146 tends to restore to an original state to exert a force on the drive button 142 along the direction Z after an external force exerted on the drive button 142 is disappeared, and thus the actuator 140 can move towards the first position from the second position.

In some embodiments, the actuator 140 also includes a flexible sleeve (not shown), for example a rubber sleeve. The flexible sleeve can be sleeved on the outside of the reset element 146, which on the one hand can be an auxiliary reset structure, and on the other hand can reduce noise caused by the contact of the reset element 146 and the connecting pillar 145 or the other elements during the movement of the actuator 140.

Figure 4:
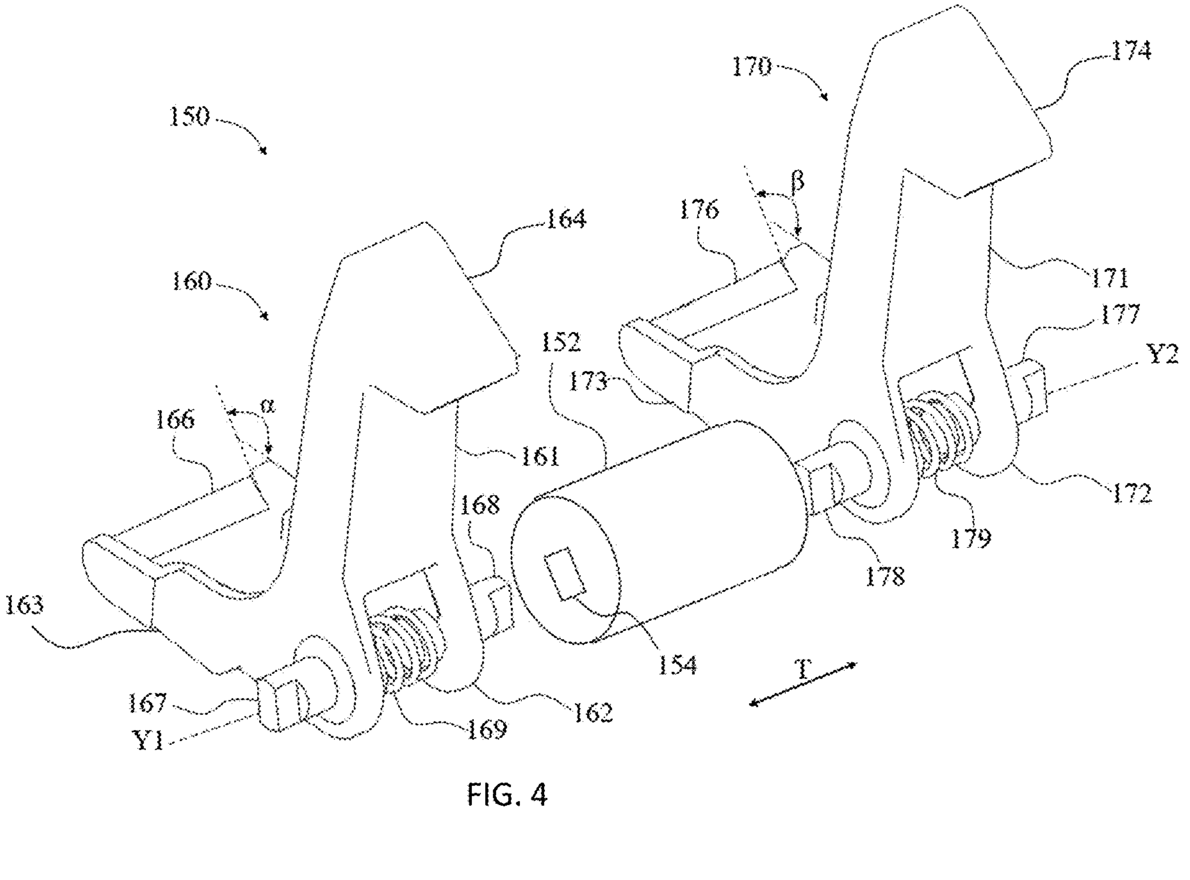
FIG. 4 is a schematic perspective view of a latch mechanism of a storage console according to one embodiment.

FIG. 4 illustrates a latch mechanism 150 of a storage console 100 according to an embodiment of the present disclosure. In the embodiment shown, the latch mechanism 150 includes a synchronizer 152 and two latch members, such as a first latch member 160 and a second latch member 170. The first latch member 160 has a first body 162 as well as a first arm 161 and a second arm 163 which are dividually arranged on the first body 162 and substantially L-shaped. A free end of the first arm 161 has a first lock hook 164. The first lock hook 164 can be located inside the storage chamber 114 of the housing 110 to engage with the first engaging groove 122 of the first closure member 120 when the first latch member 160 is in the lock position, thereby locking the first closure member 120 in the closed position. A free end of the second arm 163 has a first contact part 166 which is used to contact with the first drive pillar 141 of the actuator 140 to rotate the first latch member 160. The first contact part 166 extends upwards and outwards to form an obtuse angle α with the second arm 163, which is helpful for contacting and keeping the contact with the first drive pillar 141 and keeps this contact. A first rotating shaft 167 and a second rotating shaft 168 are arranged on two sides of the first body 162 respectively, and the first latch member 160 can be rotated around an axis Y1 parallel to the first rotating shaft 167 or the second rotating shaft 168. The first latch member 160 can also include a first biasing element 169 arranged around the opposite ends of the first rotating shaft 167 and the second rotating shaft 168. The first biasing element 169 can be a torsion spring, which is used to bias the first latch member towards the lock position.

The second latch member 170 can have a similar structure to the first latch member 160. In some embodiments, with reference to FIG. 4, the second latch member 170 has a second body 172 as well as a third arm 171 and a fourth arm 173 which are dividually arranged on the second body 172 and substantially L-shaped. A free end of the third arm 171 has a second lock hook 174. The second lock hook 174 can be located inside the storage chamber 114 of the housing 110 to engage with the second engaging groove 132 of the second closure member 130 when the second latch member 170 is in the lock position, thereby locking the second closure member 130 in the closed position. A free end of the fourth arm 173 has a second contact part 176 which is used to contact with the second drive pillar 143 of the actuator 140 to rotate the second latch member 170. The second contact part 176 can extend upwards and outwards to form an obtuse angle β with the fourth arm 173, which is helpful for contacting and keeping the contact with the second drive pillar 143 and keeps this contact. The angle β can be identical to or can be different from the angle α. Preferably, the angle β is identical to the angle α. A third rotating shaft 177 and a fourth rotating shaft 178 are arranged on two sides of the second body 172 respectively, and the second latch member 170 can be rotated around an axis Y2 parallel to the third rotating shaft 177 or the fourth rotating shaft 178. The axis Y1 and the axis Y2 can be parallel to each other or can be the same axis, and the axis Y1 and the axis Y2 can be parallel to the transverse direction T. The second latch member 170 can also include a second biasing element 179 arranged around the opposite ends of the third rotating shaft 177 and the fourth rotating shaft 178. The second biasing element 179 can be a torsion spring, which is used to bias the second latch member 170 towards the lock position.

In some embodiments, the synchronizer 152 is connected between the first latch member 160 and the second latch member 170, and both ends of which are connected with the second rotating shaft 168 of the first latch member 160 and the fourth rotating shaft 178 of the second latch member 170, respectively, and thus the rotation of either of the first latch member 160 or the second latch member 170 can drive the synchronous rotation of the other. In this manner, a force exerted on the drive button 142 is relatively biased toward one side (for example, the first latch member 160 or the second latch member 170) to make the other side (for example, the second latch member 170 or the first latch member 160) not rotate to the release position due to insufficient releasing force or the possibility of the release lag can be reduced. In some embodiments, the synchronizer 152 can be cylindrical and is formed by rigid materials, two end faces of which are provided with square holes 154 respectively, two square holes 154 are engaged with square connection parts on the second rotating shaft 168 and the fourth rotating shaft 178 respectively, such that the rotation of the first latch member 160 or the second latch member 170 drives the synchronizer 152 to rotate together, but there is no relative rotation between the first latch member 160 or the second latch member 170 and the synchronizer 152. In addition, the synchronizer 152 has a higher stiffness than the flexible material, the possibility of transferring rotation synchronously is higher, namely it reduces the possibility that the rotation of a latch member cannot be transmitted or cannot be rapidly transmitted to the other latch member synchronously due to itself own deformation.

Figure 5:
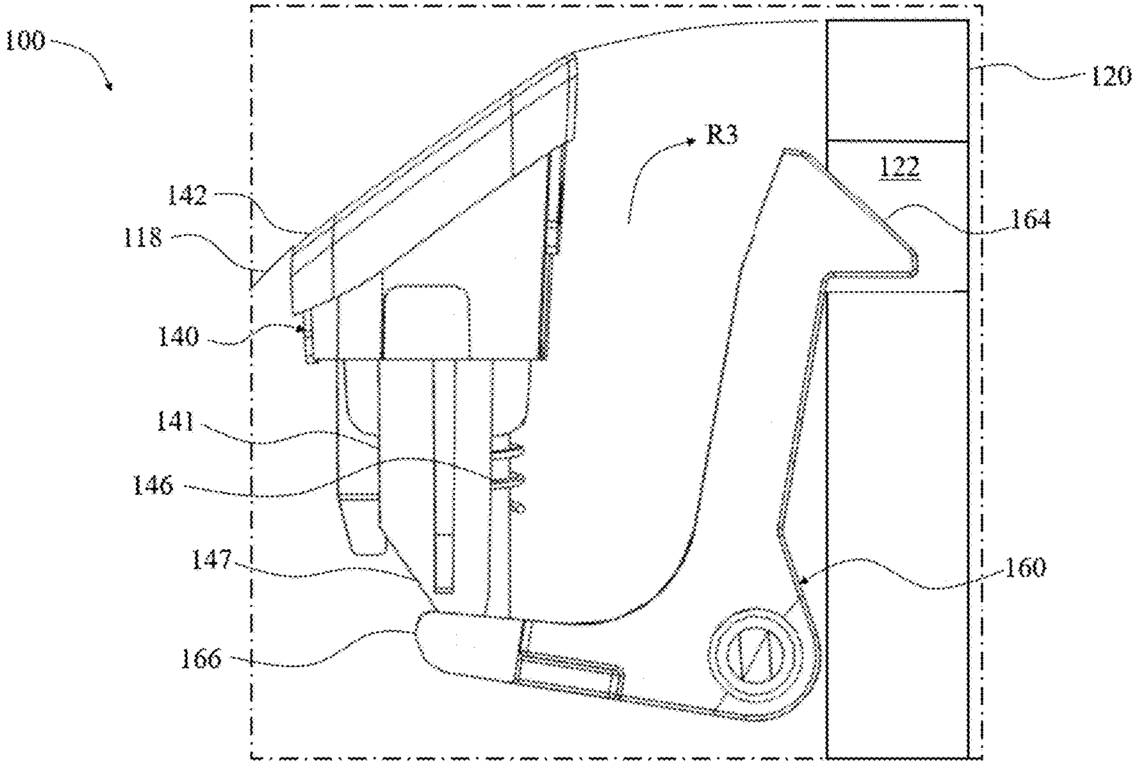
FIG. 5 is a cross-section schematic diagram of a part of a storage console according to an embodiment showing an actuator in a first position and a latch member in a lock position.
Figure 6:
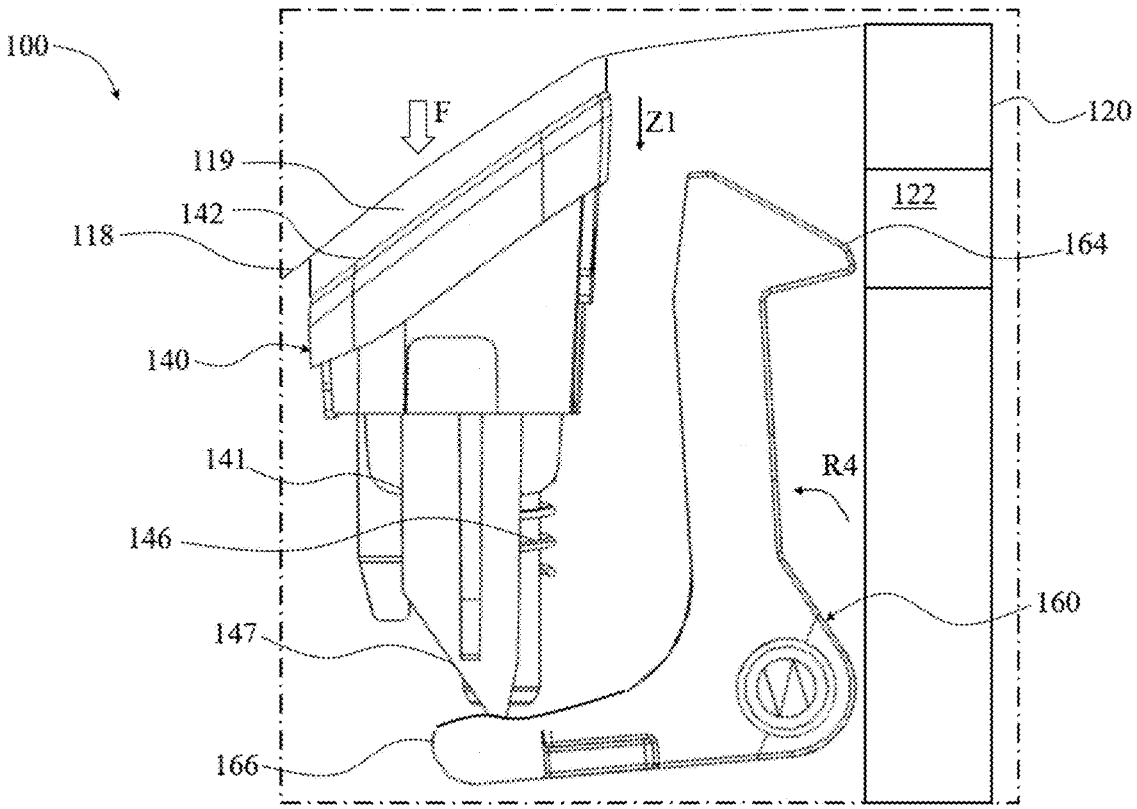
FIG. 6 is a cross-section schematic diagram of a part of a storage console according to an embodiment showing an actuator in a second position and a latch member in a release position.

FIGS. 5 and 6 illustrate a part of a storage console according to an embodiment of the present disclosure, showing a latch mechanism in the lock position and in the release position respectively. Partial structures are not shown in these figures in order to represent the related structures.

In some embodiments, when the latch mechanism 150 is in the lock position as shown in FIG. 5, the actuator 140 is in the first position, for example, an upper surface of the drive button 142 is substantially flushed with an upper surface of the end 118, the first pointed end 147 of the first drive pillar 141 adjoins or against the first contact part 166 of the first latch member 160, while the first lock hook 164 of the first latch member 160 engages in the first engaging groove 122 of the first closure member 120. Furthermore, the second pointed end 148 of the second drive pillar 143 adjoins or against the second contact part 176 of the second latch member 170, and the second lock hook 174 of the second latch member 170 engages in the second engaging groove 132 of the second closure member 130. In this manner, the first closure member 120 and the second closure member 130 are locked in the closed position, as shown in FIG. 1.

In some embodiments, as shown in FIG. 5, the first latch member 160 has a center of mass that can be biased to the first lock hook 164. In other words, the center of mass of the first latch member 160 can be closer to the first lock hook 164 but is correspondingly away from the first contact part 166. In such embodiments, the first arm 161 can be made from heavier materials in comparison to the second arm 163. Hence, when no external force is applied, the first latch member 160 has a tendency to rotate around a direction R3 (for example, the direction towards the first engaging groove 122, or the clockwise direction). In this manner, even if the retention force of the first drive pillar 141 to the first contact part 166 disappears due to damage to the storage console 100 by an external force, the first latch member 160 also tends to rotate around the direction R3 to further engage with the first engaging groove 122 of the first closure member 120 to keep the first closure member 120 closed. Similarly, the second latch member 170 also tends to rotate around the direction R3 to further engage with the second engaging groove 132 of the second closure member 130, thereby keeping the opening 112 in a closed state, and thus the possibility that the first closure member 120 or the second closure member 130 is accidentally opened to allow articles to fall out can be reduced.

In some embodiments, with reference to FIGS. 5 and 6, when the actuator 140 is subjected to an external force F (for example, a pressing force from the driver or passengers), the actuator 140 moves from the first position in FIG. 5 to the second position in FIG. 6 along a direction Z1, for example, the upper surface of the drive button 142 is located under the upper surface of the end 166, the first pointed end 147 of the first drive pillar 141 abuts against the first contact part 166 of the first latch member 160 and exerts a force to the first contact part 166 along the direction Z1, such that the first latch member 160 rotates along a direction R4 (for example, the counterclockwise direction), thereby moving the first lock hook 164 of the first latch member 160 out of the first engaging groove 122 of the first closure member 120. Furthermore, the second pointed end 148 of the second drive pillar 143 abuts against the second contact part 176 of the second latch member 170 and exerts a force to the second contact part 176 along the direction Z1 to make the second latch member 170 rotate along the direction R4, thereby moving the second lock hook 174 of the second latch member 170 out of the second engaging groove 132 of the second closure member 130. In this manner, the first latch member 160 and the second latch member 170 can be rotated to the release position, the first closure member 120 and the second closure member 130 can be rotated to the opening position, as shown in FIG. 2.

Figure 7:
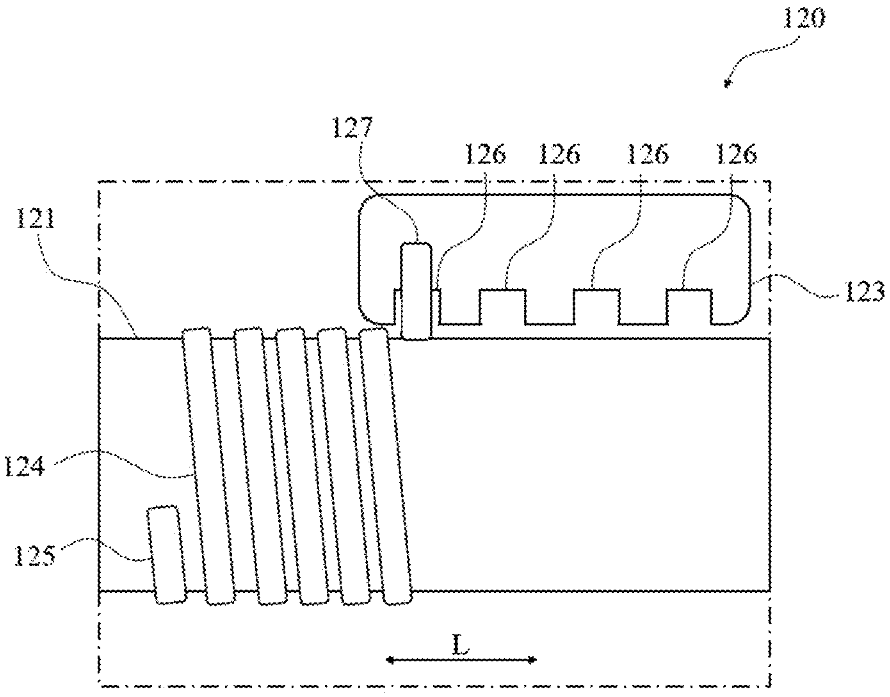
FIG. 7 is a schematic diagram of a closure member of a storage console, according to one embodiment.

FIG. 7 shows the first closure member 120 according to an embodiment of the present disclosure. The first closure member 120 includes a rotating shaft 121 and a biasing element 124. The rotating shaft 121 can extend substantially along the longitudinal direction L. The biasing element 124 is arranged around the rotating shaft 121, a first end 125 is fixed on the rotating shaft 121 and a second end 127 is connected to a support plate 123 at the bottom of the first closure member 120. The support plate 123 can have multiple rabbets 126 (recess or groove) arranged along the edge thereof. The multiple rabbets 126 are spaced from each other and are uniformly distributed on the support plate 123. The second end 127 of the biasing element 124 is accommodated in one of the rabbets 126. The first closure member 120 is no longer restricted by the first lock hook 164 after the first latch member 160 is rotated to the release position, the biasing element 124 exerts a biasing force on the first closure member 120 that is deflected towards the opening position, such that the first closure member 120 is rotated to the opening position.

It is to be understood that each rabbet 126 can be used to accommodate the second end 127 of the biasing element 124, those skilled in the art can adjust the position of the second end 127 of the biasing element 124 reasonably according to the need for the biasing force of the biasing element 124. For example, in another embodiment which is different from the embodiment shown in FIG. 7, the second end 127 of the biasing element 124 is accommodated in another rabbet 126 which is much closer to the right. In this embodiment, the biasing force of the biasing element 124 can be lesser, hence a rotational speed of the first closure member 120 can be slower when the first closure member 120 is opened. It is to be understood that those skilled in the art can accommodate the second end 127 of the biasing element in different rabbets depending on the practical biasing force or rotational speed of the closure member requirements and implement the present disclosure in other embodiments, these other embodiments also should be included in the scope of the present disclosure.

In some embodiments, the second closure member 130 can have an identical or a similar structure to the first closure member 120. For example, the first closure member 120 and the second closure member 130 can be a mirror symmetry structure relative to the longitudinal direction L. The first closure member 120 and the second closure member 130 can form a gate or cover of the storage console 100 which is opened towards both sides, such storage console 100 is also referred to as a two-door structure, bi-parting structure or wing-type structure.

In some embodiments, with reference to FIG. 2 or FIG. 6, when the closure member is in an open state, if a force F1 exerted to the drive button 142 is disappeared (for example, if the driver or passengers stop pressing the drive button 142), the reset element 146 exerts a force to the actuator 142 in a direction opposite that of the force F1 (for example, a downward force), such that the actuator 142 moves towards the first position (as shown in FIG. 5) from the second position (as shown in FIG. 6). In the meantime, the first contact part 166 of the first latch member 160 and the second contact part 176 of the second latch member 170 are no longer kept or restricted by the first drive pillar 141 and the second drive pillar 143 of the actuator 142, such that the first biasing element 169 of the first latch member 160 biases the first latch member 160 from the release position to the lock position and the first lock hook 164 moves into the storage chamber 114 of the housing 110, and the second biasing element 179 of the second latch member 170 biases the second latch member 170 from the release position to the lock position synchronously and the second lock hook 174 moves into the storage chamber 114 of the housing 110. However, the first lock hook 164 of the first latch member 160 is not engaged with the first engaging groove 122 of the first closure member 120 and the second lock hook 174 of the second latch member 170 is not engaged with the second engaging groove 132 of the second closure member 130, since the first closure member 120 and the second closure member 130 have been in an open state. In other words, after the pressing force to the drive button 142 is disappeared, the actuator 142 moves from the second position to the first position and the latch mechanism 150 is rotated from the release position to the lock position, but the first closure member 120 and the second closure member 130 are kept in the open state.

In some embodiments, with reference to FIG. 2 or FIG. 6, when the first closure member 120 is in the open state, if a force is exerted to the first closure member 120 in a direction opposite to the direction R2 (for example, when the driver or an user attempts to close the first closure member 120), the first closure member 120 is rotated towards the closed position (as shown in FIG. 1). In the meantime, the end of the first closure member 120 which adjoins the first engaging groove 122 contacts and pushes the first lock hook 164 located in the storage chamber 114, such that the first latch member 160 is rotated towards the release position from the lock position. After the first closure member 120 is rotated to the closed position, the first biasing element 169 of the first latch member 160 biases the first latch member 160 towards the lock position, such that the first lock hook 164 moves into the storage chamber 114 and engages with the first engaging groove 122 of the first closure member 120, thereby locking the first closure member 120 in the closed position.

In some embodiments, a closing process of the second closure member 130 can be similar to the above-mentioned closing process of the first closure member 120. For example, when the second closure member 130 is in an open state, if a force is exerted to the second closure member 130 in a direction opposite to the direction R1 (for example, when the driver or the user attempts to close the second closure member 130), the second closure member 130 is rotated towards the closed position (as shown in FIG. 1). In the meantime, the end of the second closure member 130 which adjoins the second engaging groove 132 contacts and pushes the second lock hook 174 located in the storage chamber 114, such that the second latch member 170 is rotated towards the release position from the lock position. After the second closure member 130 is rotated to the closed position, the second biasing element 179 of the second latch member 170 biases the second latch member 170 towards the lock position, such that the second lock hook 174 moves into the storage chamber 114 and engages with the second engaging groove 132 of the second closure member 130, thereby locking the second closure member 130 in the closed position.

As described above, the first closure member 120 and the second closure member 130 can be opened synchronously exerting a pressing force to the drive button 142 (for example, pressing the drive button 142 once), while the first closure member 120 and the second closure member 130 can be closed independently, thus the user convenience can be improved.

Figure 8:
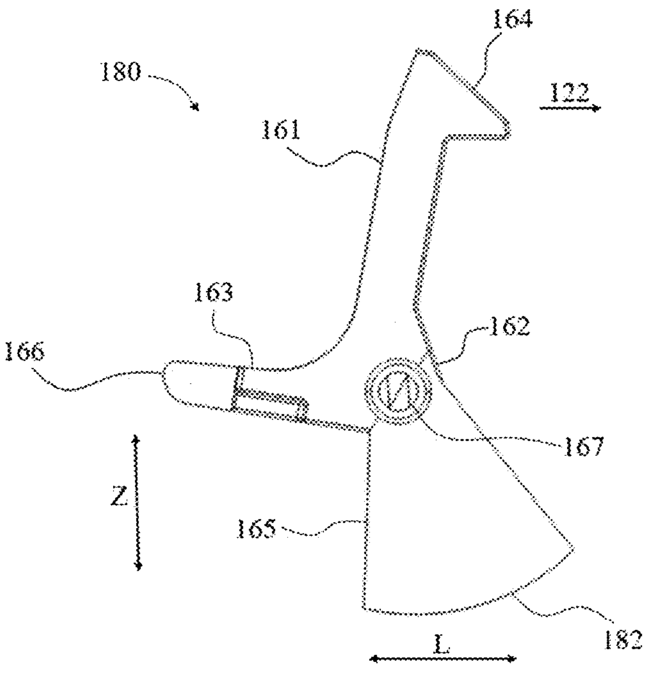
FIG. 8 is a side view of a latch member of a storage console, according to one embodiment.

FIG. 8 shows a first latch member 180 according to another embodiment of the present disclosure. The first latch member 180 can have a same or a similar part to the first latch member 160 in the above-mentioned embodiment. These same or similar parts is represented by the same reference signs in the embodiment of FIG. 8, specific contents of which can be referred to the description related to FIGS. 5 and 6. In some embodiments, with reference to FIG. 8, the first latch member 180 further includes an additional part 165 connected to the body 162. The additional part 165 is located below the first arm 161 and the second arm 163 in the direction Z. The position of the additional part 165 is relatively biased towards the first lock hook 164 and far away from the first contact part 166 in the longitudinal direction L. The additional part 165 can have a cross-section similar to a sector, a longer arc brim 182 of the sector cross-section is outward and far away from the body 162. Thus, the center of mass of the first latch member 180 can be substantially located on the center of the first rotating shaft 167, which is towards the first lock hook 164 and is in favor of the first latch member 160 rotating towards the first engaging groove 122. In such embodiment, the second latch member can have a similar structure to the first latch member 180, the center of mass of the second latch member can be substantially located on the center of the third rotating shaft 177, which is towards the second lock hook 174 and is in favor of the second latch member 170 rotating towards the second engaging groove 132. In this manner, the first latch member 180 tends to rotate towards the first closure member 120 to make the first lock hook 164 engage with the first engaging groove 122, and the second latch member also tends to rotate towards the second closure member 130 to make the second lock hook 174 engage with the second engaging groove 132, thereby keeping the opening 112 in the closed state, thus the possibility that the first closure member 120 or the second closure member 130 is accidentally opened.

In some embodiments, a sealing strip is arranged on the sidewall of the first closure member which faces the second closure member. The sealing strip substantially extends along the longitudinal direction L, and the width of the sealing strip in the transverse direction T can be greater than a spacing between the first closure member and the second closure member when they are in the closed position. The sealing strip can be flexible, such as a rubber sealing belt, which can cover a possible existing gap when the first closure member and the second closure member are closed, thus a good surface appearance can be provided. In some embodiments, a sealing strip can also be arranged on the sidewall of the second closure member, and the sealing strip can be at least partially overlapped with the sealing strip of the first closure member in the transverse direction T when they are in the closed position.

The present disclosure provides a storage console that could be opened or closed relatively and facilitates the rear passengers to access to a storage chamber.

One aspect of the present disclosure discloses a storage console. The storage console includes a housing with a storage chamber, two closure members connected to the housing, an actuator movably arranged in the housing and a latch mechanism rotatably connected to the housing. The two closure members can be rotated to open or close the storage chamber. The latch mechanism includes two latch members and a synchronizer which is connected between the two latch members and is used to make them rotate synchronously. The movement of the actuator can actuate the two latch members to rotate to a lock position in which the two latch members engage with the two closure members or a release position in which the two latch members are separated from the two closure members.

In some embodiments, the two closure members are cooperated with each other to cover the storage chamber when the latch mechanism is in the lock position. The two closure members can rotate to an open position to allow access to the storage chamber when the latch mechanism is in the release position.

In some embodiments, the two closure members are configured to pivot mirror-symmetrically to open or close the storage chamber.

In some embodiments, the actuator is configured to move between a first position and a second position. Lock hooks of the two latch members are engaged with engaging grooves of the two closure members when the actuator is in the first position. The lock hooks of the two latch members are separated from the engaging grooves of two closure members when the actuator is in the second position.

In some embodiments, the actuator includes a drive button exposed to a surface of the housing and configured to move between the first position and the second position.

In some embodiments, the actuator also includes a reset element for returning the drive button back from the second position to the first position.

In some embodiments, each of the latch members includes a contact part and a lock hook which are separated from each other and a center of mass biased towards the lock hook.

In some embodiments, when the latch member is in the lock position, the contact part is in contact with or adjacent to the actuator, and the lock hook is engaged into the engaging groove of the closure member.

In some embodiments, when the latch member is in the release position, the movement of the actuator actuates the contact part, thereby rotating the latch member to move the lock hook out of the engaging groove.

Another aspect of the present disclosure discloses a storage console. The storage console includes a housing, a first closure member and a second closure member that rotatably connected to the housing, an actuator movably arranged in the housing and a latch mechanism rotatably connected to the housing. The housing includes a storage chamber with an opening. The first closure member and the second closure member can be rotated mirror-symmetrically to open or close the opening. The latch mechanism includes a first latch member, a second latch member and a synchronizer which is connected between the first latch member and the second latch member and is used to make them rotate synchronously. The movement of the actuator can actuate the first latch member and the second latch member to rotate to a lock position in which the first latch member and the second latch member engage with the first closure member and the second closure member respectively or a release position in which the first latch member and the second latch member are separated from the first closure member and the second closure member, respectively.

The storage console according to an embodiment of the present disclosure, the two closure members can be opened synchronously by an actuator and closed independently of each other, which can improve the practicability and the convenience of the storage console.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A storage console comprising:
- a housing with a storage chamber;
- two closure members connected to the housing and rotatable to open or close the storage chamber;
- an actuator movably arranged in the housing; and
- a latch mechanism rotatably connected to the housing, wherein the latch mechanism includes two latch members and a rigid synchronizer, which is connected at opposite ends thereof to rotating shafts via connection parts between the two latch members and is used to make the two latch members rotate synchronously, wherein the rigid synchronizer prevents relative rotation of the first and second latch members relative to the rigid synchronizer, and wherein movement of the actuator actuates the two latch members to rotate to a lock position, in which the two latch members engage with the two closure members, and a release position, in which the two latch members are separated from the two closure members.

2. The storage console according to claim 1, wherein the two closure members cooperate with each other to cover the storage chamber when the two latch members are in the lock position, and the two closure members rotate to an open position to allow access to the storage chamber when the two latch members are in the release position.

3. The storage console according to claim 1, wherein the two closure members are configured to pivot mirror-symmetrically to open or close the storage chamber.

4. The storage console according to claim 1, wherein the actuator is configured to move between a first position and a second position.

5. The storage console according to claim 4, wherein the two latch members comprise lock hooks that are engaged with engaging grooves of the two closure members when the actuator is in the first position, and wherein the lock hooks of the two latch members are separated from the engaging grooves of the two closure members when the actuator is in the second position.

6. The storage console according to claim 5, wherein the actuator comprises a drive button exposed to a surface of the housing and configured to move between the first position and the second position.

7. The storage console according to claim 6, wherein the actuator comprises a reset element for returning the drive button back to the first position from the second position.

8. The storage console according to claim 7, wherein each of the two latch members comprises a contact part and a corresponding one of the lock hooks, wherein the contact part and the corresponding lock hook of each of the two latch members are separated from each other and each of the two latch members includes a center of mass biased towards the corresponding lock hook.

9. The storage console according to claim 8, wherein when the two latch members are in the lock position, each contact part is in contact with or adjacent to the actuator and each lock hook is engaged into the engaging groove of the corresponding one of the two closure members.

10. The storage console according to claim 9, wherein when the two latch members are in the release position, the movement of the actuator actuates each contact part, thereby rotating the two latch members to move each lock hook out of each engaging groove.

11. The storage console according to claim 1, wherein the storage console is a vehicle storage console configured to be installed on a vehicle.

12. A storage console comprising:

a housing including a storage chamber with an opening;

a first closure member and a second closure member rotatably connected to the housing and rotatable mirror-symmetrically to open or close the opening;

an actuator movably arranged in the housing; and a latch mechanism rotatably connected to the housing, wherein the latch mechanism includes a first latch member, a second latch member, and a rigid synchronizer, which is connected at opposite ends thereof to rotating shafts via connection parts between the first latch member and the second latch member and is used to make the first latch member and the second latch member rotate synchronously, wherein the rigid synchronizer prevents relative rotation of the first and second latch members relative to the rigid synchronizer, and wherein movement of the actuator actuates the first latch member and the second latch member to rotate to a lock position, in which the first latch member and the second latch member engage with the first closure member and the second closure member, respectively, and a release position, in which the first latch member and the second latch member are separated from the first closure member and the second closure member, respectively.

13. The storage console according to claim 12, wherein the actuator is configured to move between a first position and a second position.

14. The storage console according to claim 13, wherein the first and second latch members comprise lock hooks that are engaged with engaging grooves of the first and second closure members when the actuator is in the first position, and wherein the lock hooks of the first and second latch members are separated from the engaging grooves of the first and second closure members when the actuator is in the second position.

15. The storage console according to claim 14, wherein the actuator comprises a drive button exposed to a surface of the housing and configured to move between the first position and the second position, and wherein the actuator comprises a reset element for returning the drive button back to the first position from the second position.

16. The storage console according to claim 15, wherein each of the first and second latch members comprises a contact part and a corresponding one of the lock hooks, wherein the contact part and the corresponding lock hook of each of the first and second latch members are separated from each other and each of the first and second latch members includes a center of mass biased towards the corresponding lock hook.

17. The storage console according to claim 16, wherein when the first and second latch members are in the lock position, each contact part is in contact with or adjacent to the actuator and each lock hook is engaged into the engaging groove of the corresponding one of the first and second closure members.

18. The storage console according to claim 17, wherein when the first and second latch members are in the release position, the movement of the actuator actuates each contact part, thereby rotating the first and second latch members to move each lock hook out of each engaging groove.

19. The storage console according to claim 12, wherein the storage console is a vehicle storage console configured to be installed on a vehicle.

20. A storage console for a vehicle, the storage console comprising:

a housing configured to be located on the vehicle and including a storage chamber with an opening;

a first closure member and a second closure member rotatably connected to the housing and rotatable minor-symmetrically to open or close the opening;

an actuator movably arranged in the housing; and a latch mechanism rotatably connected to the housing, wherein the latch mechanism includes a first latch member, a second latch member, and a rigid synchronizer, which is connected at opposite ends thereof to rotating shafts via connection parts between the first latch member and the second latch member and is used to make the first latch member and the second latch member rotate synchronously, wherein the rigid synchronizer prevents relative rotation of the first and second latch members relative to the rigid synchronizer, and wherein movement of the actuator actuates the first latch member and the second latch member to rotate to a lock position, in which the first latch member and the second latch member engage with the first closure member and the second closure member, respectively, or a release position, in which the first latch member and the second latch member are separated from the first closure member and the second closure member, respectively.

* * * * *